Figure 1:
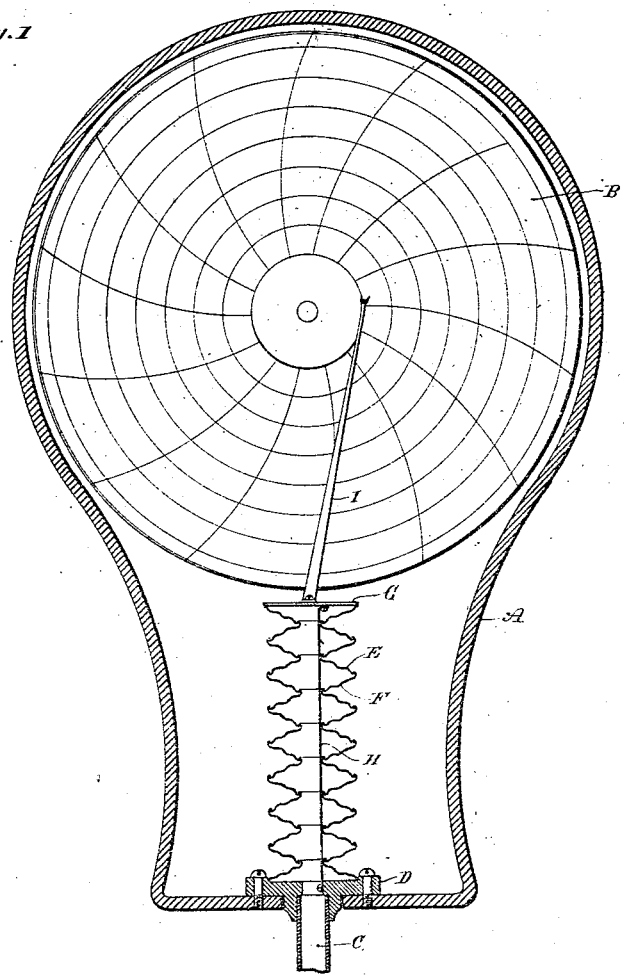

(No Model.)

W. H. BRISTOL.
PRESSURE INDICATOR AND RECORDER.

No. 420,570. Patented Feb. 4, 1890.

Witnesses:
Raphaël Netter
Robt. F. Gaylord

Inventor
William H. Bristol
By Duncan, Curtis & Page.
Attorneys.

UNITED STATES PATENT OFFICE.

WILLIAM H. BRISTOL, OF HOBOKEN, NEW JERSEY, ASSIGNOR OF TWO-THIRDS TO BENJAMIN H. BRISTOL AND FRANKLIN B. BRISTOL, BOTH OF NAUGATUCK, CONNECTICUT.

PRESSURE INDICATOR AND RECORDER.

SPECIFICATION forming part of Letters Patent No. 420,570, dated February 4, 1890.

Application filed September 28, 1889. Serial No. 325,428. (No model.)

*To all whom it may concern:*

Be it known that I, WILLIAM H. BRISTOL, a citizen of the United States, residing at Hoboken, in the county of Hudson and State of New Jersey, have invented certain new and useful Improvements in Pressure Indicators and Recorders, of which the following is a specification, reference being had to the accompanying drawings.

This invention is an improvement in devices for indicating or recording pressures and variations thereof. Though primarily designed for use as a steam-pressure indicator or recorder, it will be seen from the subsequent description of its character and capabilities that it may be employed for various other purposes.

In a prior patent granted to me, No. 389,635, dated September 18, 1888, I have shown an instrument for a similar purpose, consisting of a sinuous tube forming a series of Bourdon springs and closed at one end, to the bends of which tube on one side of the same a flexible metallic strip is secured, whereby the tendency of the tube to straighten out under the action of an internal pressure is restrained and a resulting deflection or side movement of the tube effected.

My present invention differs from the foregoing in that I employ as a substitute for the Bourdon tube a tube made up of a series of expansible sections, and I restrain the tendency to elongation as the result of internal pressure by one or more strips secured either within or without the said tube in a suitable manner to determine the proper deflection of the same.

To describe more fully the character of the tube, I would say that I may build it up of independent sections, each constructed on the principle of a single or double expansible diaphragm, or I may secure the principle of operation of a tube so constructed by using a tube made in one piece and resembling the former in configuration—as, for example, a corrugated tube in which the corrugations may be either circular and in planes at right angles to the axis of the tube or at an angle thereto, as spiral. If a metallic tube of this character be closed at one end and connected to a steam-boiler, so that a pressure will be developed inside, the resultant expansion imparts to it a marked tendency to elongate; but if the elongation be restrained, as by a strip secured to its two ends or to its ends and one or more of the sections of which it is composed, the tendency to elongate is converted into a deflection or distortion of the tube in a direction determined by the position of the restraining-strip with reference to the axis of the tube. By fixing one end of the tube the movement of the other may be utilized to indicate or record the pressures to which such movement or displacement is due.

To illustrate in detail the construction of the instrument invented by me, I now refer to the accompanying drawings.

Figure 2:
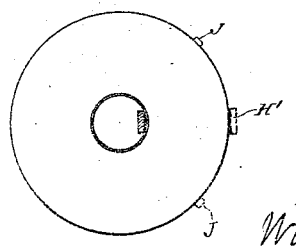
Figure 3:

Figure 1 is a view illustrating the application of my invention to a recording device, the operative portions of the invention being shown in section. Fig. 2 is a cross-section of the tube drawn to an enlarged scale. Fig. 3 is a side view of a portion of a modified form of tube.

A designates the case of any convenient indicating or recording mechanism, containing in the present instance a dial B, upon which the record is obtained.

C is a pipe connected to any boiler or receptacle the pressure in which it is desired to indicate or record.

D is a perforated head secured to the end of the pipe C and adapted to form one end of the pressure-tube.

In Fig. 1 the tube is shown as built up of independent sections, each of which sections is composed of two disks E and F, either plain or corrugated, the corrugations being concentric. These disks are secured to one another, in the manner shown, by solder, to form a series of expansible chambers or diaphragms, communicating and forming a continuous tube by openings in their center. A tube of the desired length being built up this way is closed at the upper end by a plate G, or other suitable device, and is secured at the other end over the pipe C. A flexible metallic strip H, of the same metal as that of the tube or of a metal which has approximately the same coefficient of expansion under varying temperatures, is secured to the two end pieces or plates G D. A pointer I is attached to the end of the tube, and provided, when so desired, with a marker arranged to travel over the dial B.

In a device of this kind, when an internal pressure is applied to the tube, it imparts to each of its sections a tendency to expand in the direction of the length of the tube. This tendency being restrained by the strip H, the upper end of the tube is deflected to one side, the direction of deflection being determined by the position of the strip H with reference to the axis of the tube. I therefore secure this strip within the tube to one side of the axis thereof, as shown in Fig. 1; or the strip may be secured as indicated by H' in Fig. 2, and in either case it may be secured to the ends only of the tube, or to each section of the same. If the strip be secured to the outside of the tube, a more positive deflection is obtained. If, however, an external restraining-strip be employed, an advantage is gained by using two strips, as indicated by the letters J J in Fig. 2. These strips being properly applied, no deviation of the pointer from its proper course can take place.

In lieu of the construction illustrated above, the tube may be made in one piece with corrugations, one form of such tube having spiral corrugations being shown in Fig. 3. The application to such a tube of the restraining-strip and other devices is the same as in the device previously illustrated.

I am aware that a pressure-indicator has been heretofore constructed by forming by electro-deposition a tube closed at one end and adapted to be attached to a boiler or other receptacle the pressure in which it is desired to indicate. One side or edge of this tube was formed with corrugations, while the other was straight, in consequence of which an internal pressure imparted a tendency to the corrugated side to lengthen. This tendency, being restrained by the straight portion of the tube, produced a deflection of the whole, which was utilized to indicate the pressure. Such an instrument, however, is difficult and expensive to make, and they have long been superseded in practical use by other forms of instruments designed for the same purpose. My improved device, however, is very easily and cheaply manufactured, and may be made as sensitive as desired. For instance, when made up of independent sections, all the parts may be stamped out and soldered together without difficulty; or, when made in one piece, a suitable form or mandrel of a fusible metal may be inserted in a straight tube and the latter spun by any ordinary tool for the purpose, to conform to the shape of the core, after which the latter is melted out. Other ways of making such a form of tube cheaply and easily are obviously possible.

It will be understood that this device may be used as a thermometer, barometer, or for other analogous purposes, as an apparatus in which either the direct influence of a pressure such as that of the atmosphere or that of an expansible body when exposed to varying temperatures is the cause of its operation.

What I claim is—

1. In a pressure-indicator, a tube closed at one end and composed of sections each capable under the action of an internal pressure of expansion in the direction of the length of the tube, in combination with a flexible restraining-strip connected to the tube at points to effect a deflection of the same when exposed to pressure, as set forth.

2. A tube closed at one end and composed of sections each capable under the action of internal pressure of expansion in the direction of the length of the tube, in combination with one or more flexible metallic strips secured to opposite ends of the tube out of line with or eccentric to the axis of the tube, as set forth.

3. The combination, with a tube closed at one end and fixed to a stationary support at the other and composed of independent expansible sections or diaphragms, of a restraining-strip connected to opposite ends of said tube, and a pointer carried by the free end of the tube, as set forth.

WILLIAM H. BRISTOL.

Witnesses:
ROBT. F. GAYLORD,
PARKER W. PAGE.